United States Patent [19]
Maine et al.

[11] Patent Number: 5,346,930
[45] Date of Patent: Sep. 13, 1994

[54] RIGID FIBERBOARD

[75] Inventors: Richard L. Maine, North Windham, Conn.; Joseph W. Cook, Brighton, Tenn.

[73] Assignee: Lydall, Inc., Manchester, Conn.

[21] Appl. No.: 48,677

[22] Filed: Apr. 19, 1993

Related U.S. Application Data

[63] Continuation-in-part of Ser. No. 789,065, Nov. 7, 1991, abandoned, which is a continuation-in-part of Ser. No. 714,679, Jun. 13, 1991, abandoned.

[51] Int. Cl.$^5$ .................... C09D 13/00; C08K 11/00
[52] U.S. Cl. ...................... 523/164; 524/14; 524/15; 524/315; 524/451
[58] Field of Search .................. 523/164; 524/14, 15

[56] References Cited

U.S. PATENT DOCUMENTS

| | | | |
|---|---|---|---|
| 2,705,197 | 3/1955 | Seybold | 162/145 |
| 2,988,784 | 6/1961 | Lorenian | 523/164 |
| 3,843,756 | 10/1974 | Talbott et al. | 264/24 |
| 3,993,408 | 11/1976 | Arons et al. | 524/15 |
| 4,176,978 | 12/1979 | Ruzicka et al. | 523/164 |
| 4,371,632 | 2/1983 | Grossman et al. | 523/164 |
| 4,479,912 | 10/1984 | Bullock | 264/23 |

FOREIGN PATENT DOCUMENTS 8063768 4/1983 Japan ................... 523/164

*Primary Examiner*—Kriellion S. Morgan
*Attorney, Agent, or Firm*—Griffin, Butler, Whisenhunt & Kurtossy

[57] ABSTRACT

A rigid fiberboard suitable as a replacement for the natural woods presently used for the manufacture of pencils is provided. The fiberboard essentially comprises a fiber network, together with a filler and binder. A lubricant is added to improve the sharpening characteristics of the fiberboard, and dimensional stability is preserved by incorporating a waterproofing agent to minimize the absorption of water by the fiber network.

12 Claims, No Drawings

RIGID FIBERBOARD

This is a continuation-in-part of U.S. application Ser. No. 07/789,065, filed on Nov. 7, 1991 now abandoned, which in turn is a continuation-in-part of U.S. application Ser. No. 07/714,679, filed Jun. 13, 1991, now abandoned.

BACKGROUND OF THE INVENTION

The present invention relates to a rigid fiberboard material. More particularly, the present invention relates to a rigid fiberboard useful as a pencil slat in the manufacture of pencils.

The familiar wooden shaft which forms a part of almost all standard lead pencils, colored lead pencils, cosmetic pencils and other such marking implements has traditionally been formed from pencil slats made of two kinds of wood. Approximately 85% of such pencils are manufactured from incense cedar, which grows from central Oregon to lower California. The remaining 15% are made from jelutong, which is a tropical rain forest hardwood found in Malaysia and Indonesia.

Incense cedar typically grows among large stands of fir trees and, in the past, has been obtained through the "clear cutting" of such trees. However, severe restrictions are about to be placed on the "clear cutting" operations commonly practiced by the timber industry. Thus, incense cedar will have to be selectively harvested from the fir forests in which it grows. This will, of course, result in a substantial rise in the cost of cedar to pencil manufacturers. Cedar costs will be further increased by restrictions on the supply of this wood. Approximately one-third of the incense cedar harvest area will shortly be taken out of production to protect endangered species of wildlife, such as the "Spotted" Owl.

Jelutong has, to this point, been a low cost substitute for incense cedar; however, this is likely to change in the very near future. The fragile rain forest ecosystem in which this wood grows is easily damaged by harvesting operations. Thus, access to much of the growing area has already been restricted by the Indonesian and Malaysian governments in an effort to protect their nations rain forests from degradation. Despite these efforts, illegal harvesting of jelutong from restricted areas is widespread. In view of these activities and the ecological damage they cause, several environmental groups have called for a boycott of those pencil manufacturers who employ jelutong in the manufacture of their pencils. Further, the increased demand for jelutong as a substitute for cedar in the manufacture of pencils has prompted some environmental organizations to designate jelutong as an endangered tree species.

Accordingly, it is an object of the present invention to provide a rigid fiberboard material which is useful as a substitute for the natural woods currently employed as pencil slats in the manufacture of pencils and to provide pencils made therefrom.

It is a further object of the invention to provide a rigid fiberboard in the form of pencil slats which pencil manufacturers can substitute directly into their manufacturing apparatus and processes without the need to significantly alter existing machinery or methods.

It is a still further object of the invention to provide a rigid fiberboard which, in part, comprises recycled materials.

SUMMARY OF THE INVENTION

The present invention meets the above-stated objects and other objects which will be readily apparent by providing a rigid fiberboard and a pencil slat formed therefrom. The fiberboard comprises cellulose fibers, particulate filler, a thermosetting binder, a lubricating agent and waterproofing agent. The fiberboard may further comprise at least one processing aid, colorant, etc.

The invention is based on a number of primary discoveries and several subsidiary discoveries. Firstly, as a primary discovery, it was found that cellulose fibers could be formed into a fiberboard which provides adequate properties for producing conventional pencil slats, as described below. As a subsidiary discovery, it was found that recycled cellulose fibers could also provide these properties and, hence, satisfies one of the necessary properties described below, i.e. inexpensive to fabricate. However, it was also found that the use of such recycled fibers engender their own special problems and, hence, required special additional components of the pencil slats.

Further, it was found, as a primary discovery, that to achieve the uniformity of properties required by a pencil slat, as more fully described below, the cellulose fibers must be formed into the fiberboard by a wet-laid process, as opposed to, for example, other conventional processes for laying fibers, such as air-laid, needled and felted.

As a subsidiary discovery, it was found that, while the wet-laid fiberboard made with the recycled fibers provides the required uniformity of properties, it was too fibrous, with a too great density and a too high water absorption. In this regard, as a primary discovery, it was found that these deficiencies in the wet-laid fiberboard of the recycled cellulose fibers could be overcome by incorporating in the wet-laid fiberboard a certain amount of organic particulate fillers, especially wood-like fillers, used for bulking purposes.

As a primary discovery, it was found that the fiberboard must contain a relatively critical amount of a binder to provide the required properties of the slat, and hence to the pencil, especially rigidity and sharpening properties. As a subsidiary discovery, it was found that the binder must be a thermosetting binder to provide these properties and that the thermosetting binder must be a phenolic, melamine, urea-formaldehyde or epoxy resin binder.

As a further primary discovery, it was found that the properties of the fiberboard made with recycled fibers, when made into a pencil, suffered from sharpening problems, and it was found that the fiberboard must also contain a lubricating agent and that certain lubricating agents were required in this regard, i.e. polyethylene powder, wax, talc, stearates and fatty acids.

As a further primary discovery, it was found that the fiberboard, and hence the pencil made therefrom, containing all of the recycled cellulose fibers, filler, binder and lubricating agent did not have the required dimensional stability and that a waterproofing agent, specifically wood rosin and silicone-based water repellents, was necessary in the fiberboard.

Finally, as a primary discovery, it was found that the percentages or parts of the above-described components are somewhat critical in order to achieve the required properties when using the recycled fibers. While there is some latitude in this regard, percentages or parts outside of the below-defined ranges will not provide an acceptable fiber board, and hence neither an acceptable pencil slat nor finished pencil.

Thus, briefly stated, the invention provides a pencil slat comprising about 38% to 75% of wet-laid recycled cellulose fibers recovered from recycled papers, linters and rags; about 10% to 30% of organic, particulate filler selected from the group consisting of corn cob flour, corn starch, rice hull flour, fruit pit flour, nut shell flour, wood flour and cork dust; a sufficient amount of thermosetting binder to provide rigidity to the pencil slat and within the range of about 10% to 35%, the binder being selected from the group consisting of phenolic resins, melamine resins, urea-formaldehyde resins and epoxy resins; a sufficient amount of lubricating agent to allow a pencil made with the slat to be smoothly sharpened and within the range of about 2% to 15%, the lubricating agent being selected from the group consisting of polyethylene powder, wax, talc, stearates and fatty acids; and a sufficient amount of waterproofing agent to reduce water absorption of the slat such that dimensional stability thereof is preserved and within the range of about 0.4% to 1.5%, the waterproofing agent being selected from the group consisting of wood rosin and silicone-based water repellents.

Preferably, the cellulose fibers are recovered from recycled papers, the filler is selected from the group consisting of wood flour and cork dust, the binder is a phenolic resin, the lubricating agent is selected from the group consisting of wax and stearic acid, and the waterproofing agent is wood rosin. More preferably, the papers are one or more of recycled newspapers, corrugated boxes, cardboard and kraft papers.

DESCRIPTION OF PREFERRED EMBODIMENTS

A rigid fiberboard made according to the invention is useful as a substitute for the incense cedar and jelutong currently used to make pencil shafts. Moreover, the present fiberboard is substituted directly into the currently employed pencil manufacturing apparatus and processes. The rigid fiberboard is formed in a wet-laid process on conventional paper-making equipment. Initially, the fiberboard is formed in large sheets, e.g. each having a length of about 132 inches, a width of about 110 inches and a thickness of from about 0.15 to 0.18 inch, or in rolls. Each sheet or roll is then cut, in an automated cutting process, into appropriately sized slats, e.g. measuring approximately 2.75 inches by 7.25 inches. Slats of this size closely approximate the natural wood slats currently supplied to pencil manufacturers.

As is the case with the natural wood slats currently being used, each pencil is formed from a portion of two fiberboard slats, a top slat and a bottom slat, adhered together. Prior to adhering the slats together, each slat is grooved under grooving wheels, and one or both of the slats has a glue thereon, e.g. a polyvinyl acetate glue or other suitable wood glues applied into the grooves through an appropriate dispenser. Once the glue has been applied, fired graphite lead is laid into the grooves of, usually, the bottom slat and lightly pressed into place under a roller. At least one of the slats, usually the top slat, is then adhesively treated with a wood glue to apply adhesive into the grooves and onto the flat portions of the slats between the grooves (this may be the same glue, i.e. the polyvinyl acetate, and be the same application thereof). The top and bottom slats are then pressed together and held in place under pressure until the glue sets and the slats are, thus, formed into a series of connected pencil shafts.

The shafts are squared with a diamond-tipped rotating blade and then passed to a shaping machine with top and bottom knives and shaped into the familiar hexagon or other shape by cutting the bottom and top slats, which also separates the shafts. After a coating is applied, e.g. three or four coats of paint, varnish or lacquer, the pencil shafts are printed. The shafts are then pressed into an end constrictor to reduce the diameter at one end so that a ferrule and eraser can be applied, to provide a finished pencil.

All of the above is well known in the art and further details of this conventional process need not be provided herein for sake of conciseness.

As discussed in detail below, not only does the invention provide a rigid fiberboard that eliminates the need to use natural woods in the manufacture of pencil slats and pencils, but also the fiberboard itself can be made from recycled materials, such as recycled newspaper. Moreover, the present fiberboard is far more uniform than the natural woods presently being used which evidence a good deal of variation among individual trees and among the parts of a single tree.

The present rigid fiberboard comprises from about 38% to about 75% by weight of cellulose fibers. While percentages by weight are provided hereinafter in connection with all components of the fiberboard, for practical purposes, the parts by weight are equivalent thereto and should be so understood. The fibers form the basic structural network for the fiberboard and, when properly combined with other components, provide the fiberboard with a wood-like quality. While a wide variety of cellulose fibers could be utilized, virgin cellulose fibers are too expensive to provide a practical substitute slat material, and it was found that cellulose fibers derived from recycled materials produce excellent results with natural wood-like properties, while being so inexpensive that the resultant substitute slat is practical from a cost point of view. Accordingly, the fiberboard comprises secondary cellulose fibers derived from, for example, one or more of the following sources: recycled papers, e.g. newspapers, cardboard, corrugated boxes, linters, e.g. cotton linters, denim fibers, kraft papers, e.g. kraft bags, and rags, e.g. cotton rags. All of these fibers are, of course, delignined fibers, i.e. cellulose fibers, as opposed to plant fibers themselves, which are lignocellulose fibers. The use of these recycled, biodegradable cellulose fibers not only results in the necessary reduced costs but also provides an environmentally attractive product.

To provide the fiberboard with sufficient bulk (reduce the density thereof), the fiberboard further comprises from about 10% to about 30% by weight of organic, particulate filler, used as a bulking (or density-reducing) agent. A number of organic particulates have been found most useful for this purpose, i.e. one or more of corn cob flour, rice hull flour, nut shell flour, fruit pit flour, wood flour, cork dust and corn starch.

Preferably, the filler comprises one or more organic particulates formed as by-products in various industries, such as the lumber, agriculture and food industries. In this regard, wood flour from American Wood Fiber, Wisconsin, cork dust available from Maryland Cork Co., Elkton, Md., corn cob flour supplied by Composite Materials, Inc., Montgomery, Ala., corn starch and mixtures thereof have been found to be particularly suitable. By employing filler materials which are recycled, biodegradable by-products from other industries, a more economical and environmentally desirable product can be achieved.

To provide rigidity, the fiberboard further comprises a sufficient amount of thermosetting binder to provide rigidity to the pencil slat, i.e. from about 10% to about 35% by weight of binder. The amount of binder should be sufficient to provide rigidity to the fiberboard which is at least equal to one-half the rigidity (degree of flexure) of the conventional incense cedar. In this regard, incense cedar is quite rigid and its rigidity is greater than that really necessary for a pencil shaft. Thus, adequate rigidity of the pencil is achieved when a substitute material has about one-half or more of the rigidity of incense cedar. Accordingly, the amount of binder necessary in the present fiberboard need only be that which will produce about one-half the rigidity of incense cedar. Suitable thermosetting resin binders, used either alone or in combination, are phenolic resins, melamine resins, urea-formaldehyde resins and epoxy resins. In the most preferred embodiments of the invention, the binder is a phenolic resin binder, such as the resins sold under the trademark "PLYOPHEN" by BTL Speciality Resins, Malvern, Ark., Reichhold Chemicals, Inc., Warren, N.J., "CASCOPHEN" by Borden Packaging and Industrial Products, Vancouver, B.C., "VARCUMAND DUREZ" from Oxychem, Tonowanda, N.Y. or a combination of these resins.

An important consideration when supplying a material intended as a substitute for the natural woods currently used in pencil making is that the material exhibits satisfactory sharpening characteristics. That is, the substitute material must sharpen smoothly without burrs or chips, as is the case with incense cedar and jelutong. Accordingly, the fiberboard further comprises a sufficient amount of a lubricating agent to allow a pencil made from the slat to be smoothly sharpened and within the range of about 2% to about 15% by weight. The amount used should provide sharpening characteristics at least substantially equal to that of incense cedar. While a number of lubricants are known to the art, it has been found that polyethylene powder, wax, e.g. emulsified wax and powdered wax, talc, stearates, e.g. alkali stearates, fatty acids and mixtures thereof give superior results. In the most preferred embodiment of the invention, the lubricant is either polyethylene powder, such as that available from USI Chemicals Co., Cincinnati, Ohio, under the trademark "MICROTHENE" or "PARACOL" wax emulsion from Hercules, Inc., Wilmington, Del., stearic acid or mixtures thereof.

As noted above, formulating the fiberboard with secondary cellulose fibers provides both economic and ecologic advantages and, in fact, is critical to providing slats of such low cost as to make the slats practical. However, such fibers also present their own disadvantages, and one of those disadvantages is that they tend to absorb water during the fiberboard making process and ambient moisture after the fiberboard has been formed and dried. If the fiber network absorbs too much water, then the dimensional stability of the fiberboard, and hence a pencil made therefrom, cannot be preserved. Therefore, to reduce this tendency of recycled fibers, the fiberboard further includes a sufficient amount of a waterproofing agent to reduce water absorption of the slat such that the dimensional stability thereof is substantially preserved and is at least substantially equal to that of incense cedar, and within the range of from about 0.4% to about 1.5%. While many waterproofing agents are known to the art, it has been found that wood rosin, e.g. wood rosin size, a by-product of the pulp industry, or a silicone-based water repellent provides superior results. In the most preferred embodiment of the invention, the waterproofing agent is wood rosin, e.g. wood rosin size available from Hercules, Inc., Wilmington, Del. under the trademark "PEXOL" 243.

The fiberboard may further comprise 0% to about 3% by weight of processing aids. Any number of a wide variety of processing aids commonly used by those skilled in the art may be employed including, for example, one or more of the following: retention aids, antifoaming agents, coagulants, flocculents and pH modifiers. The use of polyamide resin-type retention aids, e.g. in amounts up to about 2% or 3%, such as "KYMENE" 557H from Hercules, Inc., Wilmington, Del., or "AMRES" 8855 from Georgia Pacific, Crossett, Ark., have been found to be particularly advantageous. A retention aid of this type not only provides better retention of fines but also enhances the wet strength of the fiberboard.

Finally, the fiberboard may further include one or more colorants or dyes to provide the familiar reddish color of pencils made from cedar. In this regard, chrysoidine and paper red are particularly suitable.

As the art has long fully appreciated, while a pencil is a very commonplace and largely unnoticed writing implement, it nevertheless requires very demanding properties.

First of all, in this regard, by simply placing a pencil in hand for writing purposes, it will quickly be seen that the writing instrument must be substantially rigid. If the pencil is flexible, writing would be difficult, and if bendable, such bending would inevitably crack the fragile lead (fired ceramic graphite).

Secondly, as the lead is used, the pencil must be sharpened, and that sharpening should be smoothly performed and without burrs or chips. If a pencil is placed in an automatic pencil sharpener and the re-sharpened point comes out with burrs and chips, not only could those burrs and chips spoil the paper upon which writing takes place, but could be uncomfortable in handling the pencil, especially near the sharpened point, and would, in addition, be unsightly. Further, and probably more disconcertingly, if the sharpening is not smooth and free of burrs and chips, especially chips, then the sharpened portion of the pencil shaft could crack. Of course, any crack in that sharpened portion of the shaft would allow lateral or wobbly movement of the lead. The lead, being quite brittle, could easily break with such movement, requiring continuing sharpening of the pencil, which would be most unsatisfactory.

Somewhat similarly, a pencil slat must be capable of being smoothly machined by conventional automatic pencil-making apparatus in order to make smooth and uniform lumens for the lead and smooth and uniform contours of the pencil shaft. Otherwise, such a slat would be unacceptable for use in an automatic pencil-making machine.

Further, on hot, humid days, an improperly prepared substitute pencil slat can produce a pencil which has absorbed moisture from the air and is no longer in the form of a straight, rigid shaft, but something of a distorted shape. Thus, low moisture absorption is absolutely necessary to an acceptable pencil shaft. Even if the moisture absorption were such that the pencil did not grossly distort but was simply bowed or bent, even slightly, this would disrupt the using of that pencil for writing purposes. In addition, absorption of moisture can so swell the pencil shaft that the lumen in the shaft holding the lead could so enlarge that the lead could become loose in the lumen. This means that the lead could easily be broken, even interiorally of the shaft, as opposed to the point, and such a pencil would be most unsatisfactory. Even low amounts of moisture absorption could cause the paint of the pencil to peel, and a paint-peeled pencil is uncomfortable to use as a writing instrument.

With the present invention, sharpening properties, machinability and low moisture absorption may be at least substantially equal to natural incense cedar. Again, as noted above, incense cedar is somewhat remarkable in regard to these properties, and an adequate pencil can be made with a substitute material which has less degrees of these properties, e.g. the moisture absorption can be about twice or less that of incense cedar and still provide an adequate pencil.

Thus, a pencil must have properties of the shaft material which are quite demanding, and little latitude from these demanding properties is permissible in order to provide a satisfactory pencil. Only two woods, i.e. those noted above, provide all of these properties at desired degrees to a pencil shaft, at least at an acceptable cost, and this is why those woods are almost universally used for pencil shafts. However, as those woods become ecologically difficult, as explained above, the need for a substitute is quite great.

However, an acceptable substitute, in addition to the demanding properties noted above, must also be amenable to conventional pencil-making processes. Thus, for example, it must be available in the conventional slat form for use in automatic grooving, laying of the lead, gluing and shaping, as described above. For practical purposes, any such substitute must be completely interchangeable with conventional woods in modern day automated pencil-making processes, as noted above. Further, and just as importantly, or perhaps even more importantly, the substitute must be inexpensive or otherwise a practical substitute is not provided. A substitute of, for example, molded phenolics, could be made, but while that substitute may function adequately as a shaft (aside from possible sharpening problems), that shaft would be far too expensive for conventional lead pencils and would be impractical. Conventional lead pencils are considered consumable and even throwaway items, and therefore must be inexpensively manufactured. In order to be a viable substitute for the natural woods, the substitute must also be inexpensive to be practical.

Thus, in summary, any viable substitute for the natural woods must be rigid, sharpenable, of low moisture absorption, interchangeable in conventional pencil-making processes and inexpensive, as described above in reference to natural incense cedar. If a proposed substitute cannot meet those criteria, it cannot be an acceptable practical substitute.

Thus, the problem faced by the art was that of finding a substitute which would meet those criteria. One of those criteria, as noted above, is that of the shaft material being inexpensive. This has been solved by the use of recycled cellulose fibers, i.e. recovered from recycled papers, linters and rags, and the like. This is a very inexpensive starting material. However, recycled cellulose fibers engender their own set of problems toward making a pencil slat, and it is in the solution to these problems of recycled cellulose fibers that the present invention departs from the prior art.

First of all, in this regard, the present recycled cellulose fibers are wet laid. This is, of course, a term of art, with the well known meaning of being laid on a porous screen from an aqueous dispersion thereof. It was found that the wet laying process so orients the shortened recycled fibers in the screen direction that the oriented fibers could subsequently be formed into a pencil slat of the required uniform properties, as opposed to the more random orientation of, for example, an air-laid web ("air laid" of course, is another term of art meaning that the fibers are laid from an air dispersion thereof). Of course, recycled cellulose fibers are shortened in the recycling process, as opposed to virgin cellulose fibers, and these shortened fibers can only be appropriately oriented for uniform properties when wet laid.

However, as is also quite well known in the art, a web of air-laid fibers will be quite porous (low density), and this is inevitable in the air-laying process. An overly porous pencil slat would be quite unacceptable, since the water absorption characteristics would be too high and the decreased bulk density would not be satisfactory. Decreased bulk density results in erratic and unpredictable sharpening, flexure and straightness. On the other hand, in order to duplicate the well known lower densities of the incense cedar, some porosity is required to provide such corresponding lower densities to the substitute slat. The lower densities are required to duplicate the clean sharpening characteristics of that conventional used wood.

However, as noted above, while air-laid webs of fibers have too low a bulk density, wet-laid webs have too high a bulk density. The higher wet-laid bulk densities provide the present uniformity of properties, but lower densities of the pencil are required for good sharpening properties. These competing difficulties are solved by the present invention in the use of the present fillers in specific amounts. Thus, not only is it a matter of use of fillers, but a matter of the amount of fillers involved to provide the correct densities. Quite clearly, in a wet-laid web, that web could be filled with a wide range (percentage) of fillers, but the amount of fillers will not only effect the water absorption, but will considerably effect the sharpening properties, as described above, as well as the rigidity properties, at least to a significant degree. Thus, in regard to the present use of fillers, it is not only the use of fillers but the amount of fillers which is important, as well as the particular type of fillers.

In this latter regard, while a wide variety of fillers could be used e.g. those used in conventional particle boards, in general, the fillers found to be superior for present purposes are organic particulate fillers, i.e. corn cob flour, rice hull flour, nut shell flour, fruit pit flour, wood flour, cork dust and corn starch. It will be apparent that all of these fillers are wood-like in nature and, therefore, the recycled cellulose fibers and the present fillers in amounts to provide the correct porosity (density) present a surface for sharpening which is not unlike the surface of the natural wood pencils.

However, with the combination of the present recycled cellulose fibers and filler, the two must be adequately bound together to produce the rigidity required for a pencil. Accordingly, with the present invention, the pencil slat includes a sufficient amount of thermosetting binder to provide rigidity to the pencil slat, for the reasons explained above. This rigidity is at least equal to one-half that of incense cedar, as noted above (rigidity or flexure is determined by applying a known force to the middle portion of a pencil shaft with restrained ends and measuring the flexure caused thereby, ASTM-D790). It was discovered in this regard that, again, in view of the use of recycled cellulose fibers, the amount of the thermosetting resin is relatively critical in terms of the percentages and the thermosetting resin itself. Too little resin will not provide the rigidity, and too much resin will cause difficult sharpening. It was found that about 10% to 35% thermosetting resin will provide adequate properties, in these regards, to the pencil slat, and the consequential pencil itself.

While the art knows of a number of binder resins, it was found that the resin should be a thermosetting resin selected from the group consisting of phenolic resins, melamine resins, urea-formaldehyde resins, and epoxy resins, in order to provide superior properties. These thermosetting resins in the percentages specified will provide the required rigidity and so lock the wet-laid, recycled cellulose fibers and organic particulate filler together that an acceptable pencil shaft may be provided, and, particularly, one meeting the rigidity and porosity (density) properties, as discussed above.

However, it was also found that while the combination of wet-laid, recycled cellulose fibers, organic particulate filler and thermosetting binders provide the required structural properties, the resulting slats and pencils suffered from sharpening problems. To cure this defect, it was found that these sharpening problems could be eliminated if the pencil slat also contained a lubricating agent. Again, the amount of this lubricating agent is relatively critical, and there must be a sufficient amount of the lubricating agent to allow the pencil made with the slat to be smoothly machined in manufacturing the pencils and the shaft to be sharpened without burrs or chips, for the reasons described above. Here again, the machinability and sharpening properties are, preferably, at least substantially equal to those of incense cedar. It was also found that about 2% to about 15% of the lubricating agent was necessary. Below about 2%, smooth machining and sharpening does not occur, and above about 15%, the machining and sharpening becomes unpredictable and strength and rigidity decline. It was further found that certain lubricating agents give superior results and are fairly critical to the smooth machining and sharpening, i.e. polyethylene powder, wax, talc, stearates and fatty acids, as described above.

While the combination of the wet-laid, recycled cellulose fibers, the organic particulate filler, the thermosetting binder, and the lubricating agent provide the required structural and sharpening properties, it was found that the pencil slat had more moisture absorption than was desired, i.e. the slat did not have the desired dimensional stability. Thus, it was found that the pencil slat must contain a sufficient amount of waterproofing agent to reduce the water absorption of the slat such that dimensional stability thereof is preserved and, again, preferably, at least substantially equal to that of incense cedar. Here again, the amount of the waterproofing agent is also somewhat critical, especially in view of the recycled cellulose fibers. At below about 0.4%, the dimensional stability is not ensured, and at above about 1.5%, the waterproofing agent can interfere with other properties of the pencil shaft, e.g. painting thereof and the like. It was also found in this regard that out of a host of possible waterproofing agents, wood rosin and commercially available, silicone-based water repellents function in a superior manner.

The invention will be illustrated by the following examples. In the examples, the components are given in parts by weight, instead of percentages by weight as set forth in the foregoing description of the invention. This is to account for absorbed moisture and weighing accuracies of the various components. However, for practical application of the invention, the percentages by weight set forth in the foregoing description are fully equivalent to parts by weight used in the examples.

EXAMPLE I

| Component | Parts By Weight |
| --- | --- |
| Newspaper | 19.6 |
| Kraft Bags | 9.8 |
| Corrugated Cardboard | 9.8 |
| Wood Flour | 21.6 |
| Phenolic Resin | 31.4 |
| Polyamide Resin | .80 |
| Wood Rosin Size | .49 |
| Wax Emulsion (50% solids) | 1.6 |
| Stearic Acid | 2.9 |

EXAMPLE II

| Component | Parts By Weight |
| --- | --- |
| Newspaper | 27.1 |
| Corrugated Cardboard | 24.6 |
| Wood Flour | 7.4 |
| Cork Dust | 9.9 |
| Phenolic Resin | 27.1 |
| Wood Rosin Size | 0.62 |
| Polyamide Resin | 1.1 |

EXAMPLE III

| Component | Parts by Weight |
| --- | --- |
| Newspaper | 25.9 |
| Kraft Bags | 11.8 |
| Corrugated Cardboard | 11.8 |
| Wood Flour | 7.1 |
| Cork Dust | 14.1 |
| Wax Emulsion (50% solids) | 1.9 |
| Phenolic Resin | 25.8 |
| Wood Rosin Size | 0.59 |
| Polyamide Resin | 1.1 |

EXAMPLE IV

| Component | Parts by Weight |
| --- | --- |
| Newspaper | 24.3 |
| Corrugated Cardboard | 22.1 |
| Wood Flour | 6.6 |
| Cork Dust | 13.2 |
| Phenolic Resin | 24.3 |
| Wood Rosin Size | 0.55 |
| Wax Emulsion (50% solids) | 3.5 |
| Polyethylene Powder | 4.4 |
| Polyamide Resin | 1.0 |

EXAMPLE V

| Component | Parts By Weight |
| --- | --- |
| Newspaper | 21.6 |

-continued

| Component | Parts By Weight |
| --- | --- |
| Corrugated Cardboard | 21.6 |
| Wood Flour | 10.8 |
| Cork Dust | 12.9 |
| Phenolic Resin | 23.7 |
| Wood Rosin Size | 0.54 |
| Wax Emulsion (50% solids) | 3.4 |
| Stearic Acid | 4.3 |
| Polyamide Resin | 1.0 |

In each of the above examples, the fiberboard was made on a conventional paper-making machine and formed thereon by a conventional paper-making process, i.e. the components were fully dispersed at about 5% by weight total solids in slightly acid water, transferred to a dump chest, dewatered on a porous screen with conventional vacuum, dried at about 250° F. to 350° F., cut to sheets of about 132 inches long, 110 inches wide and 0.15 to 0.18 inch thick, and then cut into slats of approximately 2.75 inches by 7.25 inches. The slats of each of the examples were fed into a conventional pencil-making apparatus where the slats were grooved under a grooving wheel, glued with polyvinyl acetate glue, lead laid in the groove, adhered together under pressure, squared, shaped into a hexagon shape, painted and ferruled with an eraser.

The so-produced pencils had the appearance and shape of pencils produced from incense cedar. The pencils were quite adequate in handling, sharpening, writing and lead integrity. The overall costs were essentially equal to incense cedar pencils.

While preferred embodiments have been shown and described, various modifications and substitutions may be made without departing from the spirit and scope of the invention. Accordingly, it is to be understood that the present invention has been described by way of example and not by limitation.

What is claimed is:

1. A pencil slat, comprising:
   (A) about 38% to 75% of wet-laid recycled cellulose fibers recovered from recycled materials selected from the group consisting of recycled papers, linters, rags and mixtures thereof;
   (B) about 10% to 30% of organic, particulate filler selected from the group consisting of corn cob flour, corn starch, rice hull flour, nut shell flour, fruit pit flour, wood flour, cork dust and mixtures thereof;
   (C) a sufficient amount of thermosetting binder to provide rigidity to the pencil slat and within the range of about 10% to 35%, said binder being selected from the group consisting of phenolic resins, melamine resins, urea-formaldehyde resins, epoxy resins and mixtures thereof; and
   (D) a sufficient amount of lubricating agent to allow a pencil made with said slat to be smoothly sharpened and within the range of about 2% to 15%, said lubricating agent being selected from the group consisting of polyethylene powder, wax, talc, stearates, fatty acids and mixtures thereof.

2. The pencil slat of claim 1 wherein the cellulose fibers are recovered from recycled papers, the filler is selected from the group consisting of wood flour, cork dust and mixtures thereof, the binder is a phenolic resin, and the lubricating agent is selected from the group consisting of wax, stearic acid and mixtures thereof.

3. The pencil slat of claim 2 wherein the waterproofing agent is wood rosin.

4. The pencil slat of claim 2 wherein the papers are selected from the group consisting of recycled newspapers, corrugated boxes, cardboard, kraft papers and mixtures thereof.

5. The pencil slat of claim 1 further including a dye.

6. The pencil slat of claim 1 wherein the binder contains phenolic resin.

7. The pencil slat of claim 1 further containing a retention aid.

8. The pencil slat of claim 7 wherein the retention aid is a polyamide resin.

9. The pencil slat of claim 1 having machinability and low moisture absorption at least substantially equal to a pencil slat made of natural incense cedar wood.

10. A pencil made of pencil slats as defined in claim 1.

11. The pencil of claim 10 having sharpening characteristics at least substantially equal to a pencil made of natural incense cedar wood.

12. The pencil slat of claim 1, including a sufficient amount of a waterproofing agent to reduce water absorption of the slat such that dimensional stability thereof is preserved and within the range of about 0.4% to 1.5%, said waterproofing agent being selected from the group consisting of wood rosin and silicone-based water repellents.

* * * * *